(12) United States Patent
Silverman et al.

(10) Patent No.: US 12,507,077 B2
(45) Date of Patent: Dec. 23, 2025

(54) INTERFERENCE CLASSIFICATION OF WIRELESS INCUMBENTS USING SPECTRAL ANALYSIS AND AFC QUERY

(71) Applicant: Cisco Technology, Inc., San Jose, CA (US)

(72) Inventors: Matthew A. Silverman, Shaker Heights, OH (US); Michael B. Delong, Macedonia, OH (US); Ashish Pasha Sheikh, Akron, OH (US); Evgeny Yankevich, Beachwood, OH (US)

(73) Assignee: Cisco Technology, Inc., San Jose, CA (US)

( * ) Notice: Subject to any disclaimer, the term of this patent is extended or adjusted under 35 U.S.C. 154(b) by 444 days.

(21) Appl. No.: 18/064,141

(22) Filed: Dec. 9, 2022

(65) Prior Publication Data

US 2024/0015519 A1    Jan. 11, 2024

Related U.S. Application Data (60) Provisional application No. 63/367,993, filed on Jul. 8, 2022.

(51) Int. Cl.
*H04W 16/14* (2009.01)
*H04B 17/345* (2015.01)
*H04W 84/12* (2009.01)

(52) U.S. Cl.
CPC .......... *H04W 16/14* (2013.01); *H04B 17/345* (2015.01); *H04W 84/12* (2013.01)

(58) Field of Classification Search
CPC ............................. H04W 16/14; H04W 84/12
See application file for complete search history.

(56) References Cited

U.S. PATENT DOCUMENTS

| | | | |
|---|---|---|---|
| 2019/0260561 A1* | 8/2019 | Furuichi | H04L 5/14 |
| 2020/0236558 A1* | 7/2020 | Damnjanovic | H04W 74/04 |
| 2021/0120556 A1 | 4/2021 | Segev et al. | |
| 2022/0256547 A1 | 8/2022 | Macmullan et al. | |
| 2022/0272544 A1 | 8/2022 | Chitrakar et al. | |

OTHER PUBLICATIONS

Wes Purvis and Jake Snyder, "AFC and 6 GHZ Incumbents," Juniper driven by Mist AI, Dated Jun. 15, 2020, pp. 1-7.
Gaurang et al., "Next Generation Wi-Fi and 5G NR-U in The 6 GHz Bands: Opportunities & Challenges," arxiv.com, Dated: Jul. 30, 2020, pp. 1-29.

* cited by examiner

*Primary Examiner* — Tuan H Nguyen
(74) *Attorney, Agent, or Firm* — Patterson + Sheridan, LLP (57) ABSTRACT

Techniques for identifying potentially interfering wireless incumbents are disclosed. These techniques include receiving, from an electronic repository, a list of one or more wireless devices operating in a wireless communication band used by a wireless communication network. The list is selected from a plurality of wireless devices operating in the wireless communication band, based on a geographical location relating to the wireless communication network. The techniques further include scanning a plurality of radio channels relating to the wireless communication band, and identifying an interfering device for the wireless communication network based on comparing spectral data from the scanning with data in the list of one or more wireless devices.

13 Claims, 5 Drawing Sheets

INTERFERENCE CLASSIFICATION OF WIRELESS INCUMBENTS USING SPECTRAL ANALYSIS AND AFC QUERY

CROSS-REFERENCE TO RELATED APPLICATIONS

This application claims benefit of U.S. provisional patent application Ser. No. 63/367,993 filed Jul. 8, 2022. The aforementioned related patent application is herein incorporated by reference in its entirety.

TECHNICAL FIELD

Embodiments presented in this disclosure generally relate to wireless communications. More specifically, embodiments disclosed herein relate to identifying potentially interfering wireless incumbents.

BACKGROUND

The expansion of WiFi networks to the 6 GHz band raises the risk of potential interferers. For example, existing devices operating in the 6 GHz band (e.g., incumbents) may interfere with wireless communication. The use of automated frequency coordination (AFC) can help avoid WiFi devices from interfering with 6 GHz incumbents. But the inverse is not true. Existing AFC solutions do not seek to ensure that incumbents do not interfere with WiFi transmissions.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Embodiments include a method. The method includes receiving, from an electronic repository, a list of one or more wireless devices operating in a wireless communication band used by a wireless communication network. The list is selected from a plurality of wireless devices operating in the wireless communication band, based on a geographical location relating to the wireless communication network. The method further includes scanning a plurality of radio channels relating to the wireless communication band. The method further includes identifying an interfering device for the wireless communication network based on comparing spectral data from the scanning with data in the list of one or more wireless devices.

Embodiments further include a system, including a processor and a memory having instructions stored thereon which, when executed on the processor, performs operations. The operations include receiving, from an electronic repository, a list of one or more wireless devices operating in a wireless communication band used by a wireless communication network. The list is selected from a plurality of wireless devices operating in the wireless communication band, based on a geographical location relating to the wireless communication network. The operations further include scanning a plurality of radio channels relating to the wireless communication band. The operations further include identifying an interfering device for the wireless communication network based on comparing spectral data from the scanning with data in the list of one or more wireless devices.

Embodiments further include a non-transitory computer-readable medium having instructions stored thereon which, when executed by a processor, performs operations. The operations include receiving, from an electronic repository, a list of one or more wireless devices operating in a wireless communication band used by a wireless communication network. The list is selected from a plurality of wireless devices operating in the wireless communication band, based on a geographical location relating to the wireless communication network. The operations further include scanning a plurality of radio channels relating to the wireless communication band. The operations further include identifying an interfering device for the wireless communication network based on comparing spectral data from the scanning with data in the list of one or more wireless devices.

Example Embodiments

AFC modeling and regulatory design (e.g., as part of Open AFC projects) focuses on avoiding interference from 6 GHz WiFi devices to 6 GHz incumbents. But these solutions are not effective for avoiding interference from 6 GHz incumbents to WiFi devices. Without additional improvements, WiFi deployments will face interference from incumbents, even when operating in low power indoor (LPI) mode.

One or more embodiments disclosed herein relate to solutions to detect interference from incumbents on 6 GHz WiFi deployments, and configure the WiFi deployments to avoid or minimize the interference. Some existing solutions exist to attempt to classify 6 GHz band interferers (e.g., at the AP). But these solutions are often inaccurate, and typically require a specific classifier for each potential interferer or type of interferer. Attempting to detect 6 GHz incumbent interferers using existing techniques is computationally inefficient (e.g., because a huge number of classifiers must be used) and inaccurate.

One or more techniques described herein leverage an AFC database to improve these techniques. For example, a typical AFC database includes a listing of 6 GHz incumbents. But as illustrated below in relation to FIG. 6, this database is generally very large (e.g., including hundreds of thousands of incumbents), and is configured to avoid interference from 6 GHz WiFi deployments to incumbents, and not the other way around. This can be improved by querying the AFC database for a listing of incumbents expected to be relevant to a particular WiFi deployment.

For example, many AFC incumbents are highly geographically specific. The AFC database can be queried for incumbents that are geographically present in areas near the WiFi deployment. This listing of incumbents, with associated radio frequency (RF) information (e.g., center channel, bandwidth, and other suitable information) can be used by the WiFi deployment (e.g., by an AP) to identify the presence of incumbents interfering with the WiFi deployment. The WiFi network can then be configured to avoid interference with the identified incumbent(s). While the embodiments discussed below focus on identifying incumbents for the 6 GHz band, this is merely one example. One or more of these techniques can be used for any suitable wireless communication band.

Figure 1:
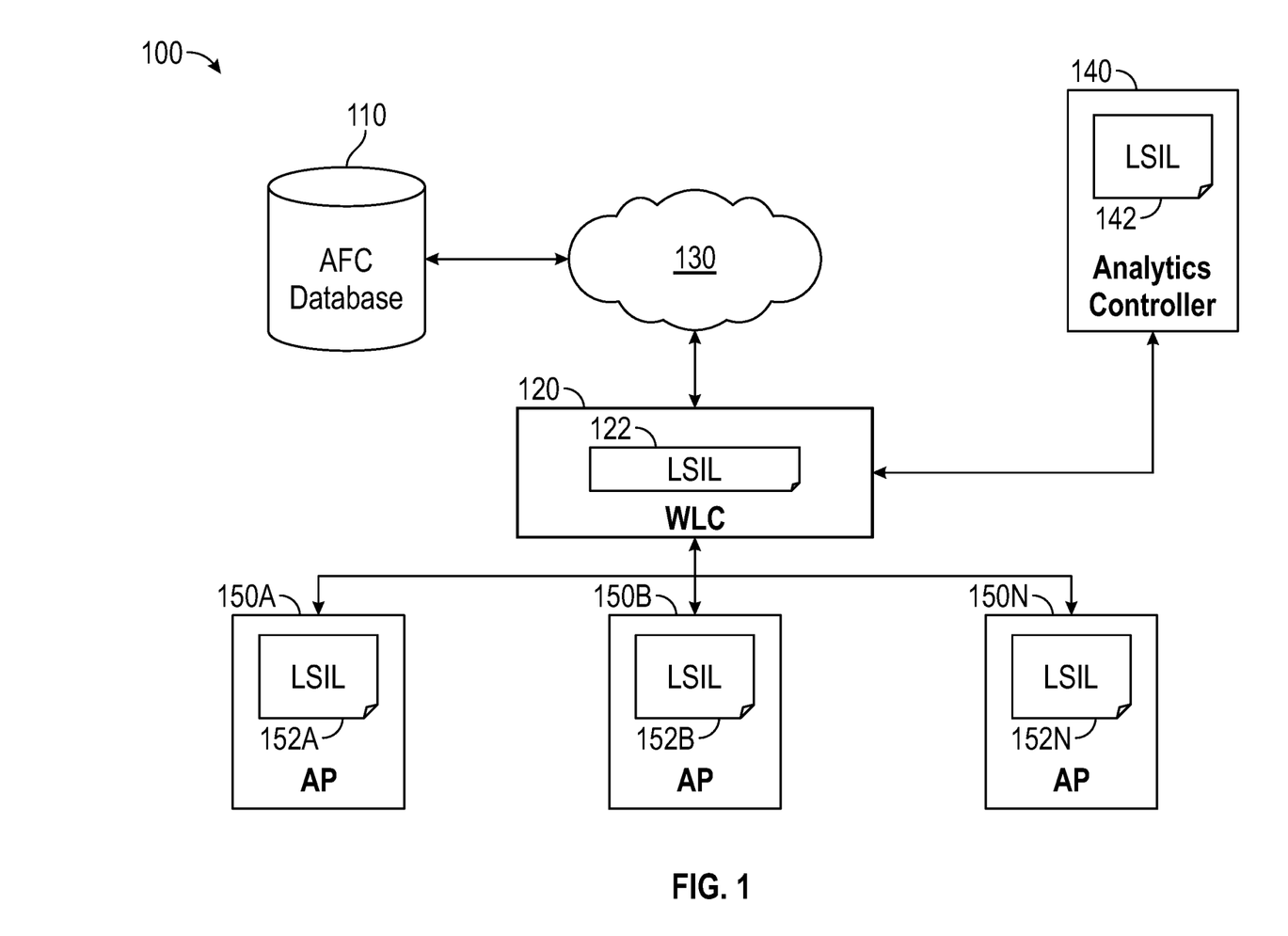
FIG. 1 illustrates a computing environment for interference classification of 6 GHz incumbents, according to one embodiment.

FIG. 1 illustrates a computing environment 100 for interference classification of 6 GHz incumbents, according to one embodiment. In an embodiment, the computing environment 100 includes an AFC database 110 connected to a WLC 120 using a communications network 130. For example, the AFC database 110 can be an electronic repository for incumbents used for 6 GHz WiFi networks. In this example, the AFC database 110 facilitates unlicensed access to the 6 GHz band by coordinating shared spectrum between WiFi access points (e.g., APs 150A-N) and incumbent licenses operating in the 6 GHz band. This is merely one example, and the AFC database 110 can be any suitable electronic component used to identify potentially interfering devices, as described further below.

The WLC 120 can be connected to the AFC database 110 using any suitable communication network, including the Internet, another wide area network (WAN), a local area network (LAN), or any other suitable communication network. In an embodiment, the WLC 120 includes a location specific incumbent list (LSIL) 122. For example, the WLC 120 can retrieve the LSIL 122 from the AFC database 110. In this example, the WLC 120 can use a database query, an application programming interface (API) call, or any other suitable technique to retrieve the LSIL 122.

In an embodiment, the LSIL 122 describes a list of incumbent devices (e.g., 6 GHz band incumbent devices) that are geographically nearby to the WLAN serviced by the WLC 120. For example, the LSIL 122 can describe the top N devices with the smallest path loss within L Km of the WLAN. In an embodiment, the location of the WLAN is determined based on the geographic location of the APs 150A-N serviced by the WLC 120. For example, the WLC 120 can maintain a record of the geographic location of the APs 150A-N (e.g., latitude and longitude, global positioning system (GPS) identifier, or any other marker for geographic location). The WLC 120 can query the AFC database 110 for the N devices nearest to any of the APs 150A-N. Alternatively, the WLC 120 can query the AFC database 110 for devices nearest to the WLC 120, or nearest to any other network device or geographical location (e.g., a user-defined geographical location).

In an embodiment, the LSIL 122 includes data describing characteristics of the listed incumbents. For example, the LSIL 122 can include, for each incumbent, a distance to the WLAN, an expected path loss to the network, a name string identifying the incumbent, a center frequency for the incumbent, a bandwidth for the incumbent, and any other suitable information. This is merely an example.

In an embodiment, the WLC 120 pushes the LSIL 122, or portions of the LSIL 122, to an analytics controller 140. For example, the analytics controller 140 can identify analytics for the WLAN and control various aspects of the network. The analytics controller 140 can maintain an LSIL 142, as a per-site listing of incumbents. For example, the analytics controller 140 could service multiple WLCs (e.g., the WLC 120 and additional WLCs) for a given site. The analytics controller 140 can use the LSIL 122 to add information to the LSIL 142 relating to incumbents retrieved by the WLC 120. This is merely an example. The LSIL 142 can include any suitable incumbent data. Further, an LSIL can be retrieved from the AFC database 110 using any suitable network component, including the analytics controller 140 or one or more of the APs 150A-N.

In an embodiment, the WLC 120 further provides the LSIL 122 (or portions of the LSIL 122) to the APs 150A-N. Each of the APs 150A-N can then maintain its own respective LSIL 152A-N. For example, each AP 150A-N can maintain an LSIL 152A-N identifying a subset of the incumbents in the LSIL 122 that are relevant to the respective AP 150A-N. The WLC 120 can provide this subset to each of the APs 150A-N, the APs 150A-N can parse the LSIL 122 to identify relevant incumbents, or any other suitable technique can be used.

In an embodiment, each of the APs 150A-N uses its respective LSIL 152A-N to do precise detection of incumbents to avoid interference. For example, each of the APs 150A-N can include a respective 6 GHz classifier. The 6 GHz classifier can be used to identify potentially interfering incumbents, but for accuracy needs information describing characteristics of the incumbents. Each of the APs 150A-N can provide the incumbent information in its respective LSIL 152A-N to its classifier (e.g., characteristics of the incumbents geographically relevant to that AP), and the AP can use the classifier and the characteristics to identify potentially interfering 6 GHz incumbents. As one example, the respective AP can identify energy in specific overlaps with WiFi channels, based on the LSIL 152A-N information. This is discussed further, below, with regard to FIGS. 3-6.

In an embodiment, each of the APs 150A-N reports to the WLC 120 detection of an interfering incumbent. The WLC 120 can look up the string information for the incumbent (e.g., if the WLC 120 does not provide that information to the AP). The WLC 120 can further use information about the interfering incumbent to configure the WLAN to avoid interference with the incumbent.

In an embodiment, the various components of the computing environment 100 communicate using one or more suitable communication networks, including the Internet, a WAN, a LAN, or a cellular network, and uses any suitable wired or wireless communication technique (e.g., WiFi or cellular communication). Further, in an embodiment, the WLC 120, analytics controller 140, and AFC database 110 can be implemented using any suitable combination of physical compute systems, cloud compute nodes and storage locations, or any other suitable implementation. For example, any, or all, of the WLC 120, analytics controller 140, and AFC database 110, could be implemented using a respective server or cluster of servers.

Figure 2:
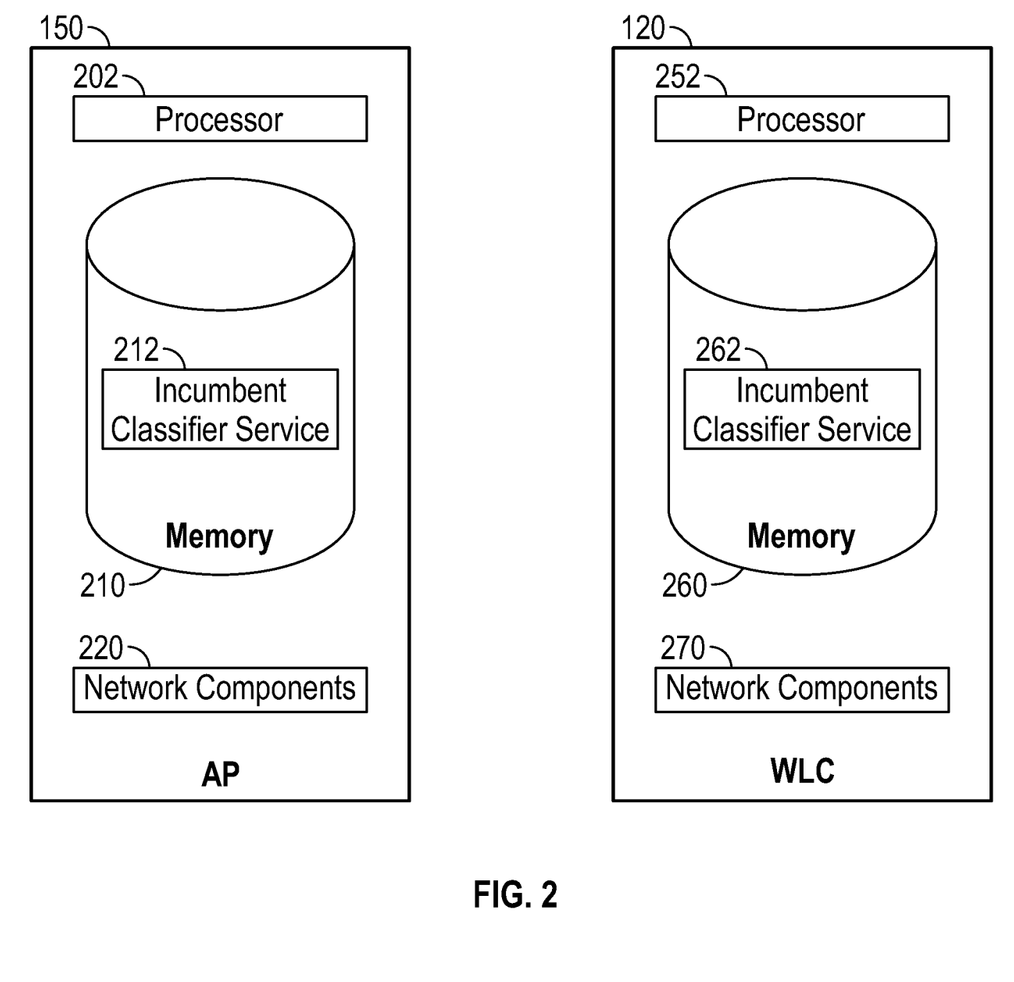
FIG. 2 illustrates a wireless access point (AP) and wireless local area network (WLAN) controller (WLC) for interference classification of 6 GHz incumbents, according to one embodiment.

FIG. 2 illustrates an AP 150 and WLC 120 for interference classification of 6 GHz incumbents, according to one embodiment. The AP 150 includes a processor 202, a memory 210, and network components 220. In an embodiment, the AP 150 corresponds with any of the APs 150A-N illustrated in FIG. 1. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP 150 to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 150. The program code is generally described as various functional "applications" or "modules" within the memory 210, although alternate implementations may have different functions and/or combinations of functions. Within the memory 210, the classifier service facilitates detecting incumbent interferers and configuring a network accordingly. This is discussed further, below, with regard to FIGS. 3-6.

The WLC 120 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the WLC 120 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the WLC 120. The program code is generally described as various functional "applications" or "modules" within the memory 260, although alternate implementations may have different functions and/or combinations of functions. Within the memory 260, the incumbent classifier service 262 facilitates detecting incumbent interferers and configuring a network accordingly. This is discussed further, below, with regard to FIGS. 3-6. As illustrated in FIGS. 1-2, any suitable component in a wireless communication network can facilitate detecting incumbent interferers, including an AP, a WLC, an analytics server, or any other suitable component.

While the AP 150 and WLC 120 are each illustrated as a single entity, in an embodiment, the various components can be implemented using any suitable combination of physical compute systems, cloud compute nodes and storage locations, or any other suitable implementation. For example, the AP 150, the WLC 120, or both could be implemented using a server or cluster of servers. As another example, the AP 150, the WLC 120, or both, can be implemented using a combination of compute nodes and storage locations in a suitable cloud environment. For example, one or more of the components of the AP 150, the WLC 120, or both, can be implemented using a public cloud, a private cloud, a hybrid cloud, or any other suitable implementation.

Although FIG. 2 depicts the incumbent classifier service 212 as being located in the memory 210 and the incumbent classifier service 262 as being located in the memory 260, that representation is also merely provided as an illustration for clarity. More generally, the AP 150, the WLC 120, or both, or both, may include one or more computing platforms, such as computer servers for example, which may be co-located, or may form an interactively linked but distributed system, such as a cloud-based system, for instance. As a result, the processors 202 and 252, and the memories 210 and 260, may correspond to distributed processor and memory resources within the computing environment 100. Thus, it is to be understood that the incumbent classifier service 212 and the incumbent classifier service 262 may be stored at any suitable location within the distributed memory resources of the computing environment 100.

Figure 3:
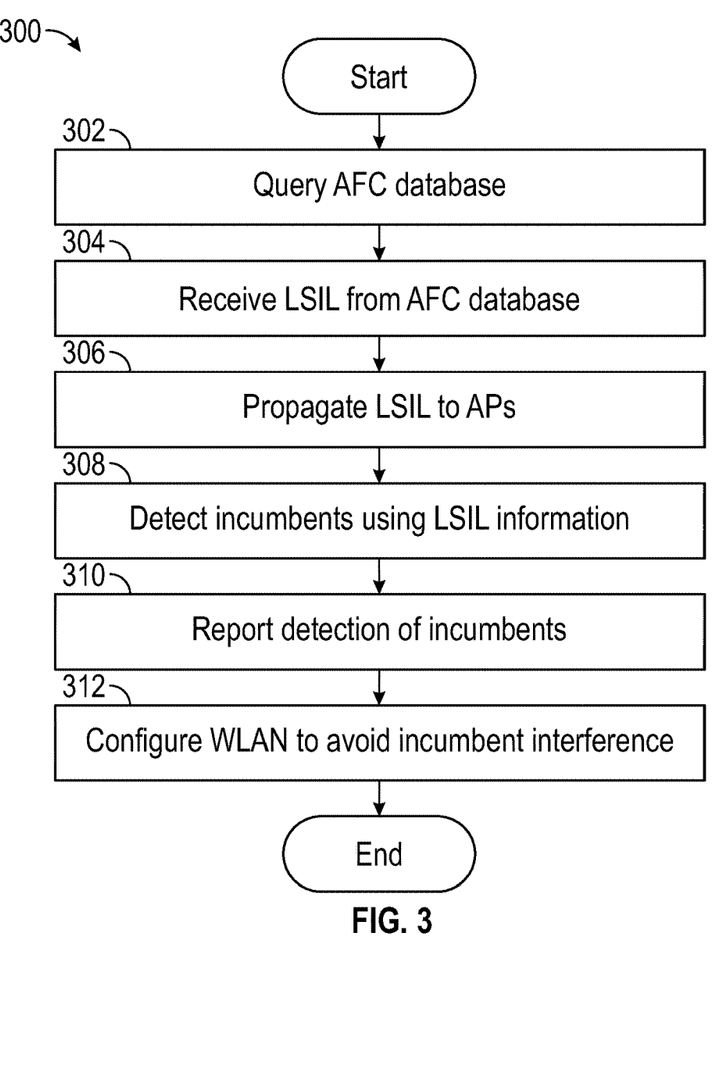
FIG. 3 is a flowchart illustrating for interference classification of 6 GHz incumbents, according to one embodiment.

FIG. 3 is a flowchart 300 illustrating for interference classification of 6 GHz incumbents, according to one embodiment. At block 302 an incumbent classifier service (e.g., the incumbent classifier service 262 in the WLC 120 illustrated in FIG. 2, the incumbent classifier service 212 in the AP 150, or any other suitable incumbent classifier service) queries an AFC database. For example, the incumbent classifier service can query the AFC database (e.g., the AFC database 110 illustrated in FIG. 1).

As discussed above in relation to FIG. 1, the AFC database 110 can be any suitable electronic repository or system (e.g., an electronic database, a cloud storage system, an on-premises storage system, or any other suitable system). Further, in an embodiment, the incumbent classifier service uses a typical AFC query (e.g., as used in existing AFC solutions). Alternatively, the incumbent classifier service uses a new query (e.g., a database query, an API call, or any other suitable request). In an embodiment, the incumbent classifier service can include in the query a geographical identifier relating to the subject wireless network, which the AFC database can use to select potentially relevant incumbents.

At block 304, the incumbent classifier service receives an LSIL from the AFC database. In an embodiment, as discussed above in relation to FIG. 1, the LSIL (e.g., the LSIL 122 illustrated in FIG. 1) describes a list of incumbent devices (e.g., 6 GHz band incumbent devices) that are geographically nearby to the relevant wireless network (e.g., the WLAN in which the incumbent classifier service is operating). For example, the LSIL can describe the top N devices with the smallest path loss within L Km of the WLAN.

As discussed above, in an embodiment the incumbent classifier service provides to the AFC database 110 a geographical identifier for the WLAN. Further, in an embodiment, the parameters of the LSIL (e.g., N and L) can be set by default at the AFC database 110, can be passed from the incumbent classifier service to the AFC database 110, or can be identified using any other suitable technique. For example, the incumbent classifier service can determine suitable values for N and L based on default values, configurable values (e.g., configurable values set by a system administrator for the WLAN using a suitable user interface), dynamically determined values (e.g., using machine learning (ML) or any other suitable technique).

As described above in relation to FIG. 1, in an embodiment the LSIL includes data describing characteristics of the listed incumbents. For example, the LSIL can include, for each incumbent, a distance to the WLAN, an expected path loss to the network, a name string identifying the incumbent, a center frequency for the incumbent, a bandwidth for the incumbent, and any other suitable information. This is merely an example.

At block 306, the incumbent classifier service propagates the LSIL to APs. For example, as described above in relation to FIG. 1, in an embodiment the incumbent classifier service operates in a suitable controller (e.g., the WLC 120, analytics controller 140, or any other suitable controller). The controller retrieves the LSIL for the WLAN, or for a portion of the WLAN serviced by the controller (e.g., for all APs associated with the controller). The incumbent classifier service can then propagate an AP specific LSIL to each AP. The AP specific LSIL can identify incumbents that are particularly relevant to each AP (e.g., based on the geographical location of the AP, radio frequency (RF) characteristics of the AP, network configuration parameters of the AP, or any other suitable data). In an embodiment, the incumbent classifier service (e.g., operating at a WLC) identifies the incumbents to propagate for each AP, based on a larger LSIL provided by the AFC database and relevant to multiple APs in multiple geographical locations. Alternatively, or in addition, the AFC database can generate an LSIL that identifies incumbents relevant to different APs (e.g., based on the geographical location of the APs). For example, the query at block 302 can identify a geographical location for multiple APs, and the AFC database can generate an LSIL (or multiple LSILs) that identify potentially relevant incumbents for each AP.

At block 308, the incumbent classifier service detects incumbents using the LSIL information. For example, the incumbent classifier service can operate on an AP (e.g., the incumbent classifier service 212 illustrated in FIG. 1). The AP can detect incumbents, by using the LSIL information to identify energy in specific overlaps with WiFi channels. This is discussed further, below, with regard to FIG. 4.

At block 310, the incumbent classifier service reports detection of incumbents. For example, as discussed above in relation to block 308, an AP can detect the presence of one or more interfering incumbents using LSIL data. The AP can then report the detected incumbents to a controller (e.g., the WLC 120 illustrated in FIG. 1). This is merely an example.

At block 312, the incumbent classifier service configures the WLAN to avoid incumbent interference. For example, an incumbent classifier service operating on a WLC (e.g., the incumbent classifier service 262 illustrated in FIG. 1) can receive a report from associated APs identifying incumbent interferers. The WLC can then use that information to identify the incumbents (e.g., look up the name of the incumbents), and to configure network parameters to improve network performance. For example, the WLC can configure the relevant APs to avoid operating in impacted channels, to operate in lower power for impacted channels, or to otherwise operate to avoid or reduce interference with the incumbents.

Figure 4:
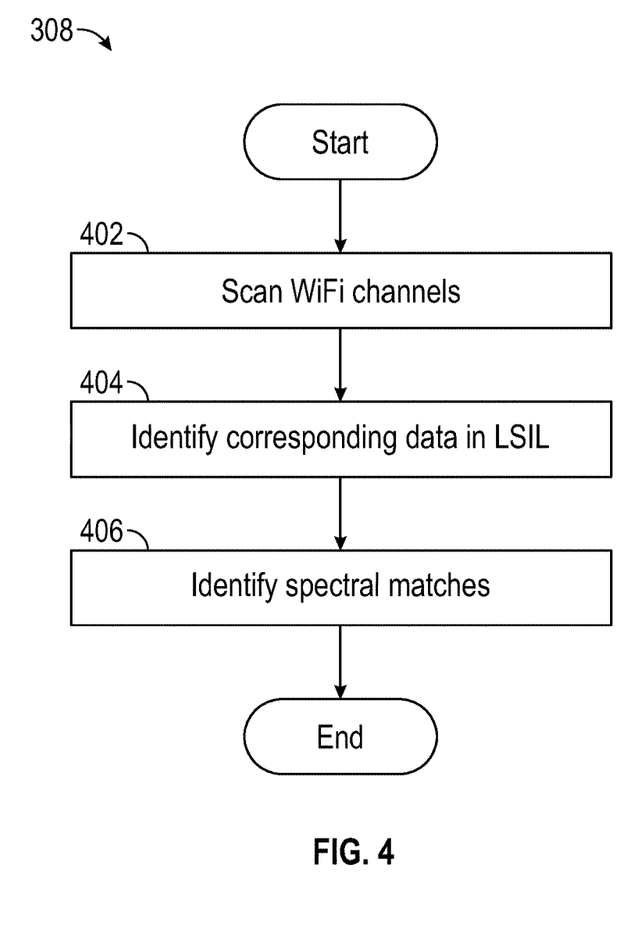
FIG. 4 is a flowchart illustrating detecting incumbents at APs for interference classification of 6 GHz incumbents, according to one embodiment.

FIG. 4 is a flowchart illustrating detecting incumbents at APs for interference classification of 6 GHz incumbents, according to one embodiment. In an embodiment, FIG. 4 corresponds with block 308 illustrated in FIG. 3. At block 402, an incumbent classifier service (e.g., the incumbent classifier service 212 illustrated in FIG. 2) scans WiFi channels. In an embodiment, the incumbent classifier service scans WiFi channels to capture spectral data, to match with data from the LSIL and identify incumbents. For example, the incumbent classifier service can scan 160 MHz channels for the 6 GHz band. This is discussed further, below, with regard to FIG. 5. As discussed above, in one example the APs (e.g., the APs 150A-N illustrated in FIG. 1) detect and classify incumbent interferers. But this is merely an example. Any suitable network device or component can detect incumbents.

At block 404, the incumbent classifier service identifies corresponding data in the LSIL. For example, as discussed above, the incumbent classifier service can use LSIL data provided by an AFC database and tailored to the geographical location of the detecting device (e.g., the geographical location of the AP). The incumbent classifier service can identify center frequency data for incumbents, bandwidth data for incumbents, and any other suitable data for incumbents, from the LSIL.

At block 406, the incumbent classifier service identifies spectral matches. This is discussed further, below, with regard to FIG. 5. For example, the incumbent classifier service can compare overlaps in energy from scanned WiFi channels (e.g., scanned 160 MHz channels for the 6 GHz band) with incumbent data from the LSIL (e.g., identifying center frequencies, bandwidth, and other data). The incumbent classifier service can identify an interfering incumbent using this comparison.

Figure 5:
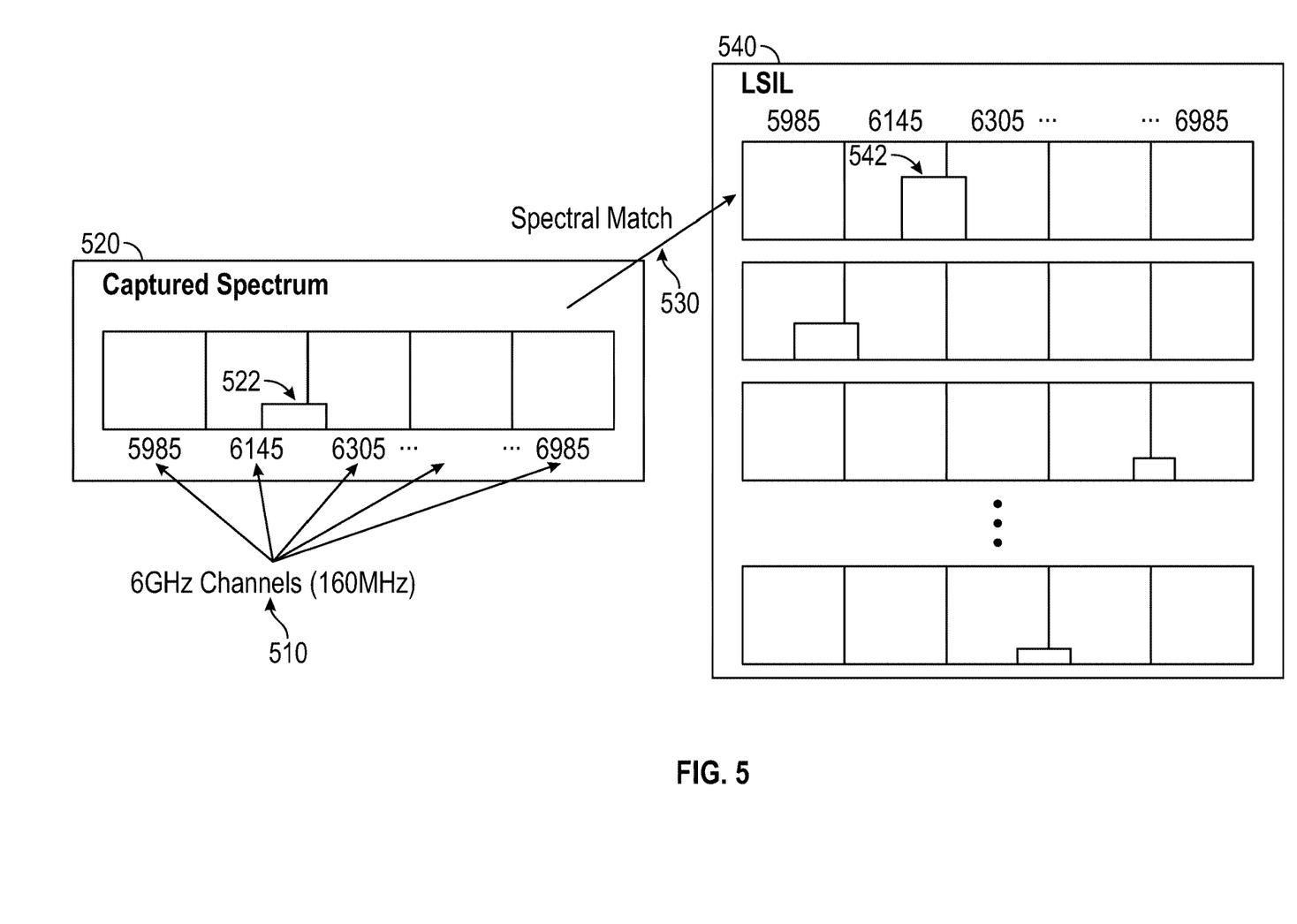
FIG. 5 illustrates spectral matching for interference classification of 6 GHz incumbents, according to one embodiment.

FIG. 5 illustrates spectral matching for interference classification of 6 GHz incumbents, according to one embodiment. In an embodiment, in incumbent classifier service (e.g., the incumbent classifier service 212 illustrated in FIG. 2) scans WiFi channels 510. For example, the incumbent classifier service can scan 160 MHz channels for the 6 GHz band to generate the captured spectrum 520. This is merely an example, and any suitable channel width can be used for any suitable band.

As illustrated, the captured spectrum 520 indicates the presence of a potentially interfering incumbent at 522, with energy present overlapping the 6145 MHz and 6305 MHz channels. An LSIL 540 includes information about potentially relevant incumbents (e.g., incumbents relevant to the AP performing the scan based on the geographical location of the AP).

The incumbent classifier identifies a spectral match 530 (e.g., between the captured spectrum 522 and the LSIL data 542) by comparing the LSIL information 542, indicating that the specified incumbent is also expected to have energy overlapping the 6145 MHz and 6305 MHz channels, with the capture spectrum 522. In an embodiment, the incumbent classifier service identifies spectral matches within a given threshold of similarity. This threshold can be set by default, can be user configured (e.g., by a system administrator using a suitable user interface), can be determined dynamically (e.g., using ML), or can be determined using any other suitable technique.

Figure 6:
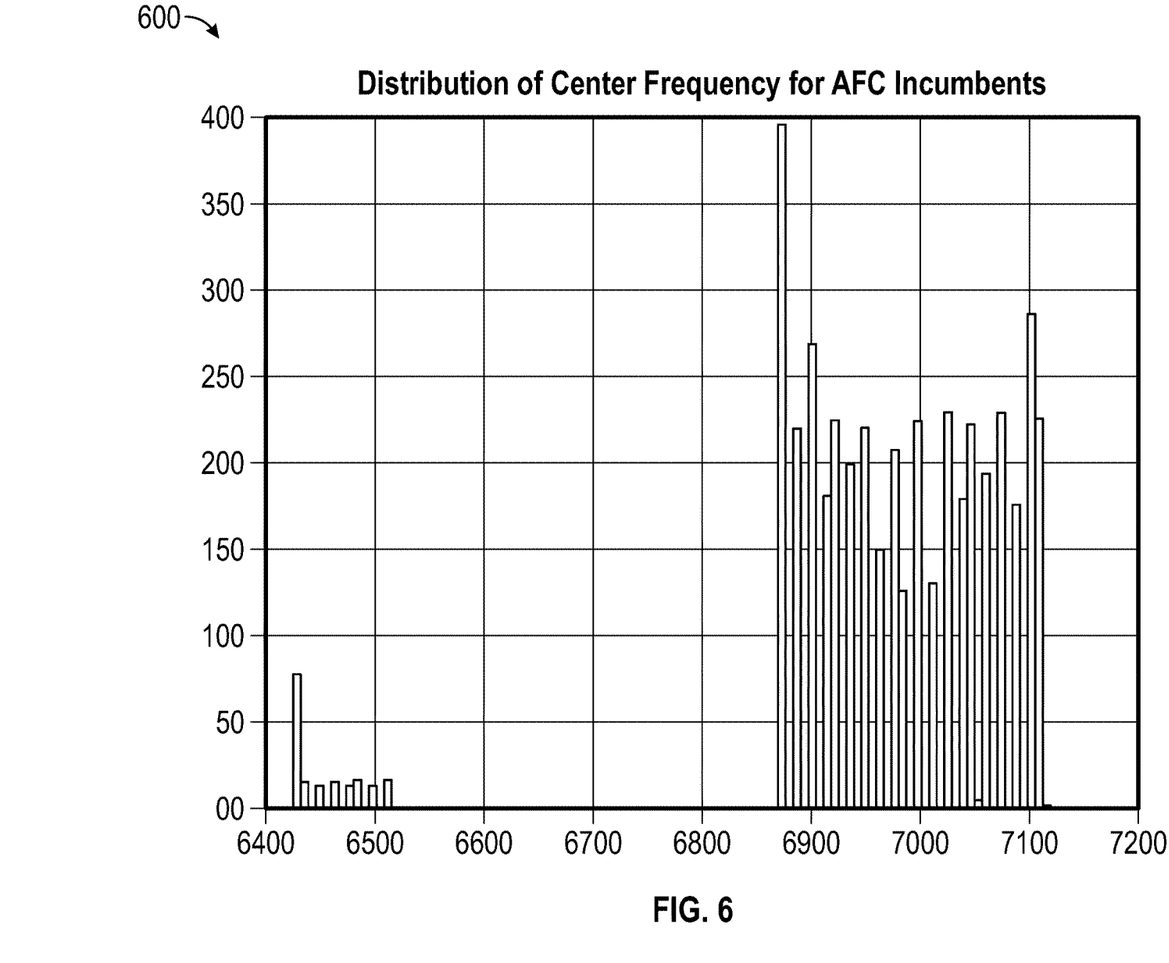
FIG. 6 illustrates AFC signal distribution for interference classification of 6 GHz incumbents, according to one embodiment.

FIG. 6 illustrates AFC signal distribution for interference classification of 6 GHz incumbents, according to one embodiment. In an embodiment, a graph 600 illustrates distribution of center frequencies for AFC incumbents. As discussed above, typical AFC databases include a very large number of incumbents (e.g., hundreds of thousands of incumbents). The graph 600 illustrates an example sample of center frequencies for AFC incumbents. As illustrated, a very large number of potentially interfering incumbents are potentially present across the 6 Ghz band. Detecting these incumbents is significantly improved, using one or more of the techniques discussed herein to identify the most relevant incumbents (e.g., based on geographical location of the WLAN), for interference classification.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
communicating, by a processor, a query to an automated frequency coordination (AFC) database, wherein the query indicates a geographical location of a wireless communication network that uses a wireless communication band;
receiving, by the processor and from the AFC database, a list of one or more wireless devices operating in the wireless communication band, wherein the one or more wireless devices are selected, based on geographical locations of the one or more devices and the geographical location of the wireless communication network, from a plurality of wireless devices operating in the wireless communication band, wherein the list indicates spectral data for the one or more wireless devices;

scanning, by the processor, a plurality of radio channels of the wireless communication band to determine spectral data for the plurality of radio channels; and identifying, by the processor, an interfering device for the wireless communication network based on determining a wireless device of the one or more wireless devices that has spectral data indicated by the list that overlaps with the spectral data from the scanning.

2. The method of claim 1, wherein the wireless communication band comprises a 6 GHz band and the wireless communication network comprises a WiFi network.

3. The method of claim 2, wherein the list of one or more wireless devices comprises a list of incumbent devices operating in the 6 GHz band.

4. The method of claim 1, wherein the processor is part of a wireless local area network controller (WLC).

5. The method of claim 1, further comprising configuring the wireless communication network to avoid interfering with the identified interfering device.

6. The method of claim 1, wherein a WLC in the wireless communication network receives the list of one or more devices, the method further comprising:

propagating information about the one or more devices from the WLC to an analytics controller for the wireless communication network, wherein the analytics controller is associated with a plurality of WLCs.

7. The method of claim 1, wherein identifying the interfering device for the wireless communication network based on comparing spectral data from the scanning with data in the list of one or more wireless devices comprises:

comparing data from the scanning with at least one of: (i) central frequency data or (ii) bandwidth data included in the list of one or more wireless devices.

8. A system, comprising:

a processor; and a memory having instructions stored thereon which, when executed on the processor, performs operations comprising:

communicating a query to an automated frequency coordination (AFC) database, wherein the query indicates a geographical location of a wireless communication network that uses a wireless communication band;

receiving, from the AFC database, a list of one or more wireless devices operating in the wireless communication band used by the wireless communication network, wherein the one or more wireless devices are selected, based on geographical locations of the one or more devices and the geographical location of the wireless communication network, from a plurality of wireless devices operating in the wireless communication band, wherein the list indicates spectral data for the one or more wireless devices;

scanning a plurality of radio channels of the wireless communication band to determine spectral data for the plurality of radio channels; and identifying an interfering device for the wireless communication network based on determining a wireless device of the one or more wireless devices that has spectral data indicated by the list that overlaps with the spectral data from the scanning.

9. The system of claim 8, wherein the wireless communication band comprises a 6 GHz band and the wireless communication network comprises a WiFi network.

10. The system of claim 9, wherein the list of one or more wireless devices comprises a list of incumbent devices operating in the 6 GHz band.

11. A non-transitory computer-readable medium having instructions stored thereon which, when executed by a processor, performs operations comprising:

communicating, by a processor, a query to an automated frequency coordination (AFC) database, wherein the query indicates a geographical location of a wireless communication network that uses a wireless communication band;

receiving, from the AFC database, a list of one or more wireless devices operating in the wireless communication band used by the wireless communication network, wherein the one or more wireless devices are selected, based on geographical locations of the one or more devices and the geographical location of the wireless communication network, from a plurality of wireless devices operating in the wireless communication band, wherein the list indicates spectral data for the one or more wireless devices;

scanning a plurality of radio channels of the wireless communication band to determine spectral data for the plurality of radio channels; and identifying an interfering device for the wireless communication network based on determining a wireless device of the one or more wireless devices that has spectral data indicated by the list that overlaps with the spectral data from the scannings.

12. The non-transitory computer-readable medium of claim 11, wherein the wireless communication band comprises a 6 GHz band and the wireless communication network comprises a WiFi network.

13. The non-transitory computer-readable medium of claim 12, wherein the list of one or more wireless devices comprises a list of incumbent devices operating in the 6 GHz band.

* * * * *